United States Patent [19]

Lin

[11] Patent Number: 5,421,273
[45] Date of Patent: Jun. 6, 1995

[54] COLLAPSIBLE TABLE

[76] Inventor: Yuan-Hsiung Lin, No. 99, Tai-Yuan Rd., Taipei City, R.O.C., Taiwan, Prov. of China

[21] Appl. No.: 209,909

[22] Filed: Mar. 14, 1994

[51] Int. Cl.6 .................................................. A47B 3/06
[52] U.S. Cl. ...................................... 108/187; 108/34; 108/180; 403/263; 403/256; 403/170; 135/118; 135/907
[58] Field of Search ............... 108/187, 188, 186, 192, 108/180, 123, 67, 34, 153; 403/83, 84, 231, 263, 261, 256, 170, 217, 378, 379; 135/123, 156, 157, 120.02, 120.04, 118, 151, 907

[56] References Cited

U.S. PATENT DOCUMENTS

| | | | |
|---|---|---|---|
| 2,023,870 | 12/1935 | Casott | 108/34 |
| 2,486,437 | 11/1949 | Ryder | 108/180 X |
| 2,511,452 | 6/1950 | Anderson et al. | 135/157 |
| 2,605,958 | 8/1952 | Russell | 403/263 X |
| 2,653,688 | 9/1953 | Gordon | 135/118 X |
| 3,834,549 | 9/1974 | Burg et al. | 108/187 X |
| 3,967,327 | 7/1976 | Severson | 108/187 X |
| 4,505,609 | 3/1985 | Vella | 403/170 X |
| 4,630,550 | 12/1986 | Weitzman | 108/180 X |
| 5,056,439 | 10/1991 | Hodge, Jr. et al. | 108/34 |
| 5,230,491 | 7/1993 | Tseng | 403/217 X |

Primary Examiner—Kenneth J. Dorner
Assistant Examiner—Janet M. Wilkens
Attorney, Agent, or Firm—Morton J. Rosenberg; David I. Klein

[57] ABSTRACT

A collapsible table includes four stretchers connected at four sides by four four-way pipe joints and two stretcher connectors, four upright supporting frames respectively and vertically connected to the four-way pipe joints at the bottom, a table cloth having four sleeves at four sides respectively mounted around the four stretchers, and a bracing device having four bracing bars radially suspended below the table cloth and respectively connected to either upright supporting frame by a respective clamping plate, and four anchoring devices respectively mounted on the upright supporting frames for fastening to the ground.

1 Claim, 6 Drawing Sheets 5,421,273

COLLAPSIBLE TABLE

BACKGROUND OF THE INVENTION

The present invention relates to a collapsible table which can be collapsed and packed by the table cloth thereof when not in use.

Various collapsible tables have been designed for use outdoors, and have appeared on the market. These collapsible tables are commonly lightweight, however, they are not strong enough for carrying heavy loads.

SUMMARY OF THE INVENTION

It is one object of the present invention to provide a collapsible table which is strong and stable for carrying heavy loads. It is another object of the present invention to provide a table cloth for a collapsible table which can be fastened up to form a carrying bag for carrying the collapsed table frame. It is another object of the present invention to provide anchoring devices for a collapsible table which can be fastened to the ground to anchor the collapsible table when the collapsible table is set up.

DETAILED DESCRIPTION OF THE PREFERRED EMBODIMENT

Figure 1:
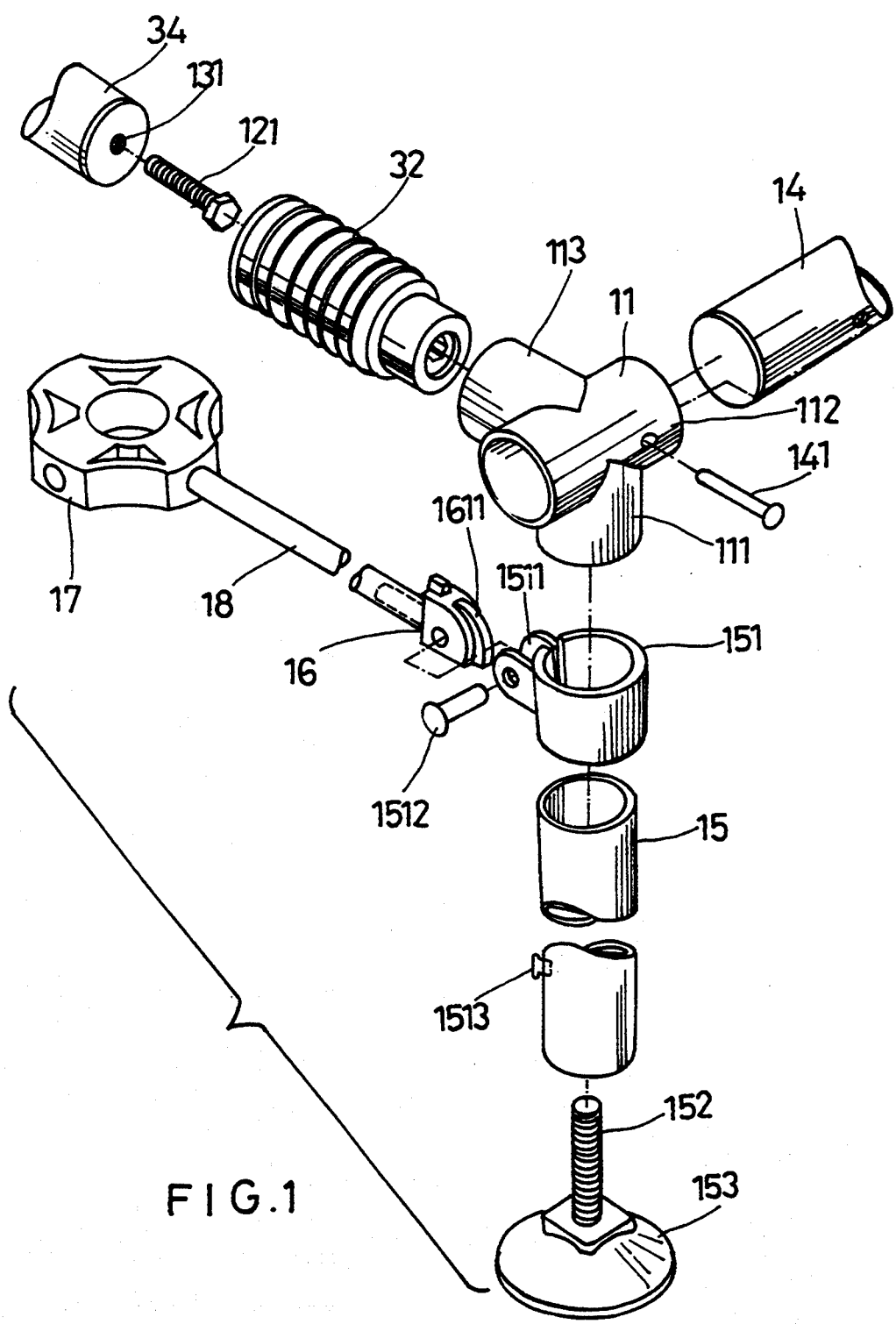
FIG. 1 is an exploded view of frame parts of a collapsible table according to the present invention.

A collapsible table in accordance with the present invention is made of substantially rectangular shape, therefore frame parts of the collapsible table are symmetrical at four corners. To provide a canvas stretching feature on the frame, two of the corners, one shown in FIG. 1, include an additional connector explained hereinafter. Referring to FIG. 1 a connector 32 having a plug joint and a stretcher 34 are connected to a first horizontal coupling portion 113 and of a four-way pipe joint 11. The first horizontal coupling portion 113 is perpendicularly connected to a second horizontal coupling portion 112 in the middle. An upright supporting frame 15 is perpendicularly fastened to a bottom coupling portion 111 of the four-way pipe joint 11 at the bottom. The connector 432 has an opposite end embedded with a screw 121, which is threaded into a screw hole 131 on one end of the stretcher 34. The stretcher 34 has the other end inserted into the second horizontal coupling portion 112 another of four-way pipe joint 11 and is then fixed in position by a lock pin 141. The upright supporting frame 15 has a top end fitted into the bottom coupling portion 111 on the four-way pipe joint 11, and a bottom end fastened to the upright screw rod 152 on a cushion 153 by a screw joint. A clamping plate 151 is fastened around the upright supporting frame 15 and stopped above a stop rod 1513, having two opposite ends 1511 coupled to a brace connector 16 by a pin 1512. The brace connector 16 has an arched flange 1611 at one end stopped against the outside wall of the supporting frame 15. The opposite end of the brace connector 16 is coupled to a bracing bar 18. The opposite end of the bracing bar 18 is connected to a coupling device 17.

Figure 2:
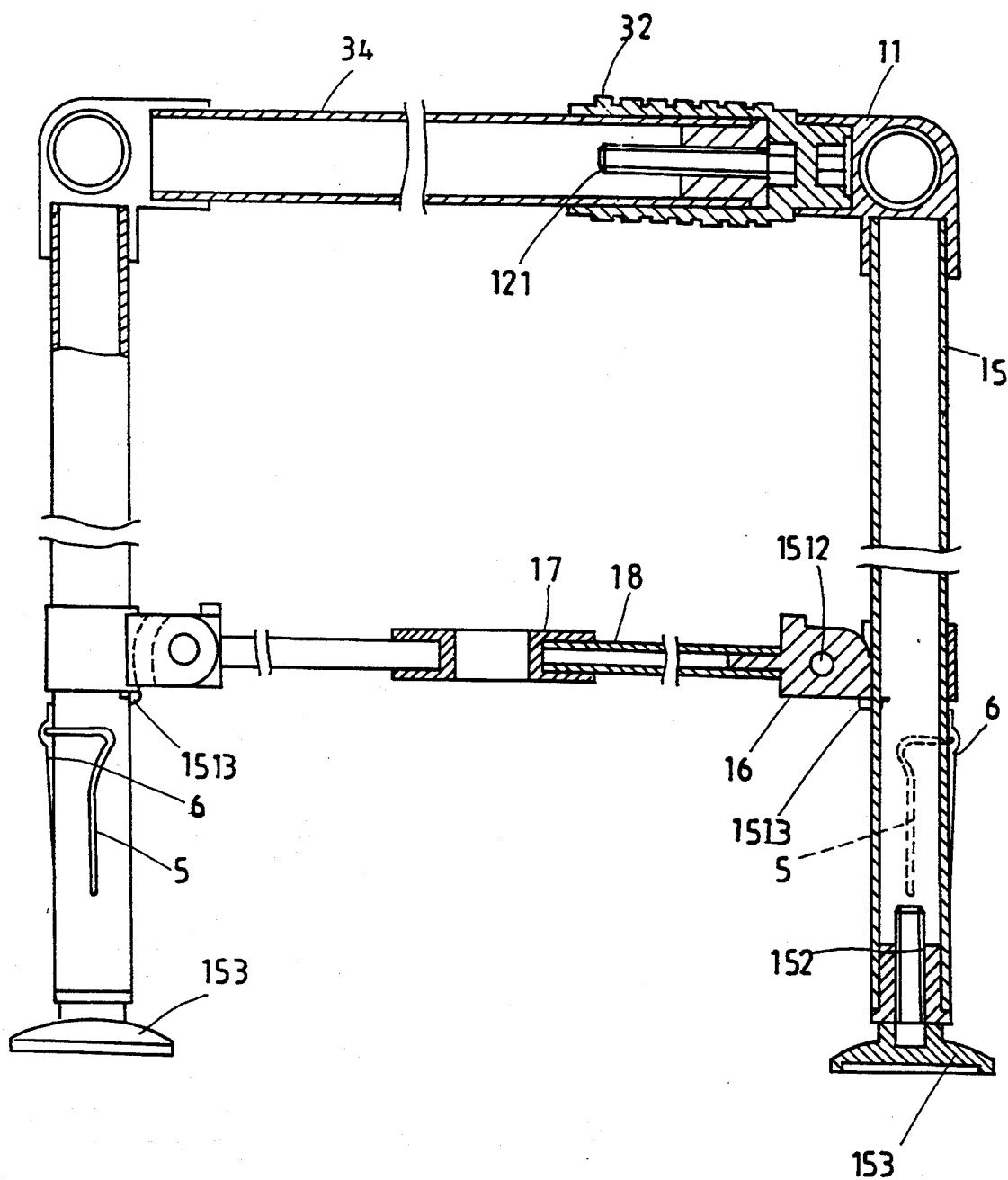
FIG. 2 is a side elevation in section of a collapsible table according to the present invention.
Figure 2A:
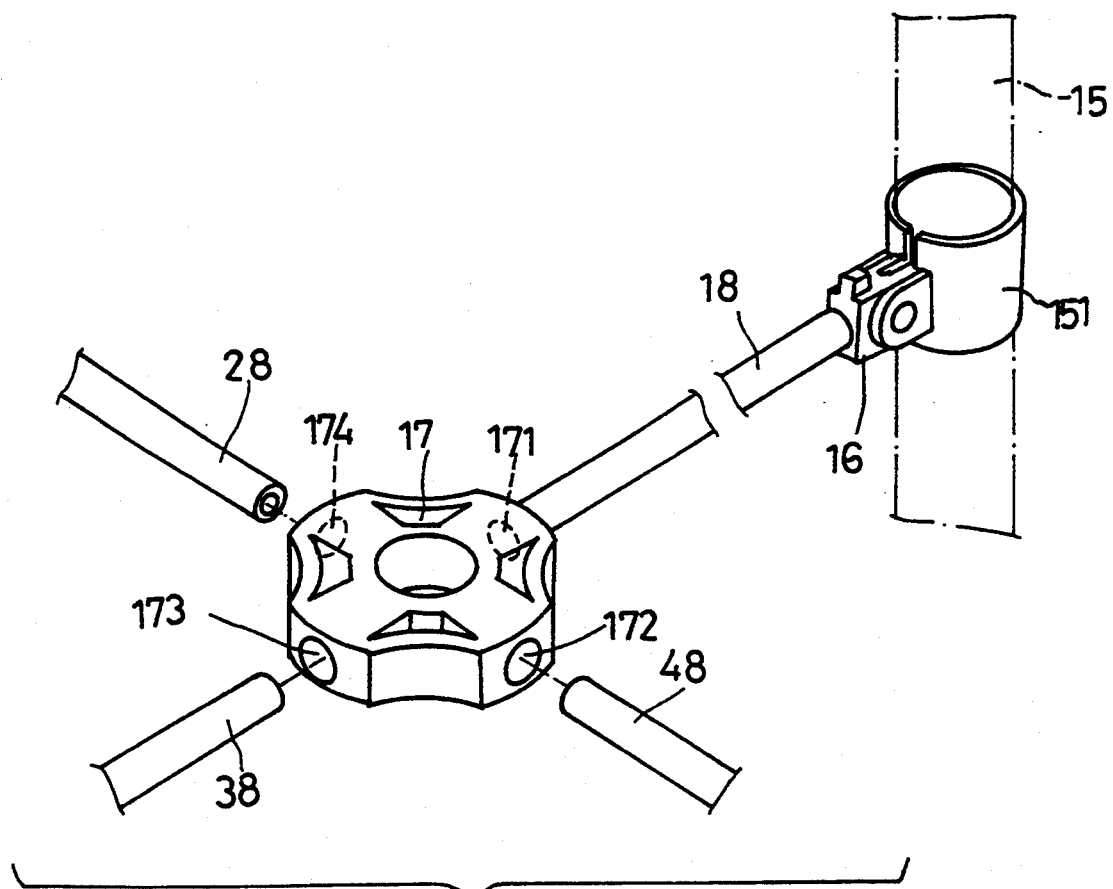
FIG. 2A is an exploded view of the coupling device and the bracing bars of the collapsible table shown in FIG. 2.
Figure 3:
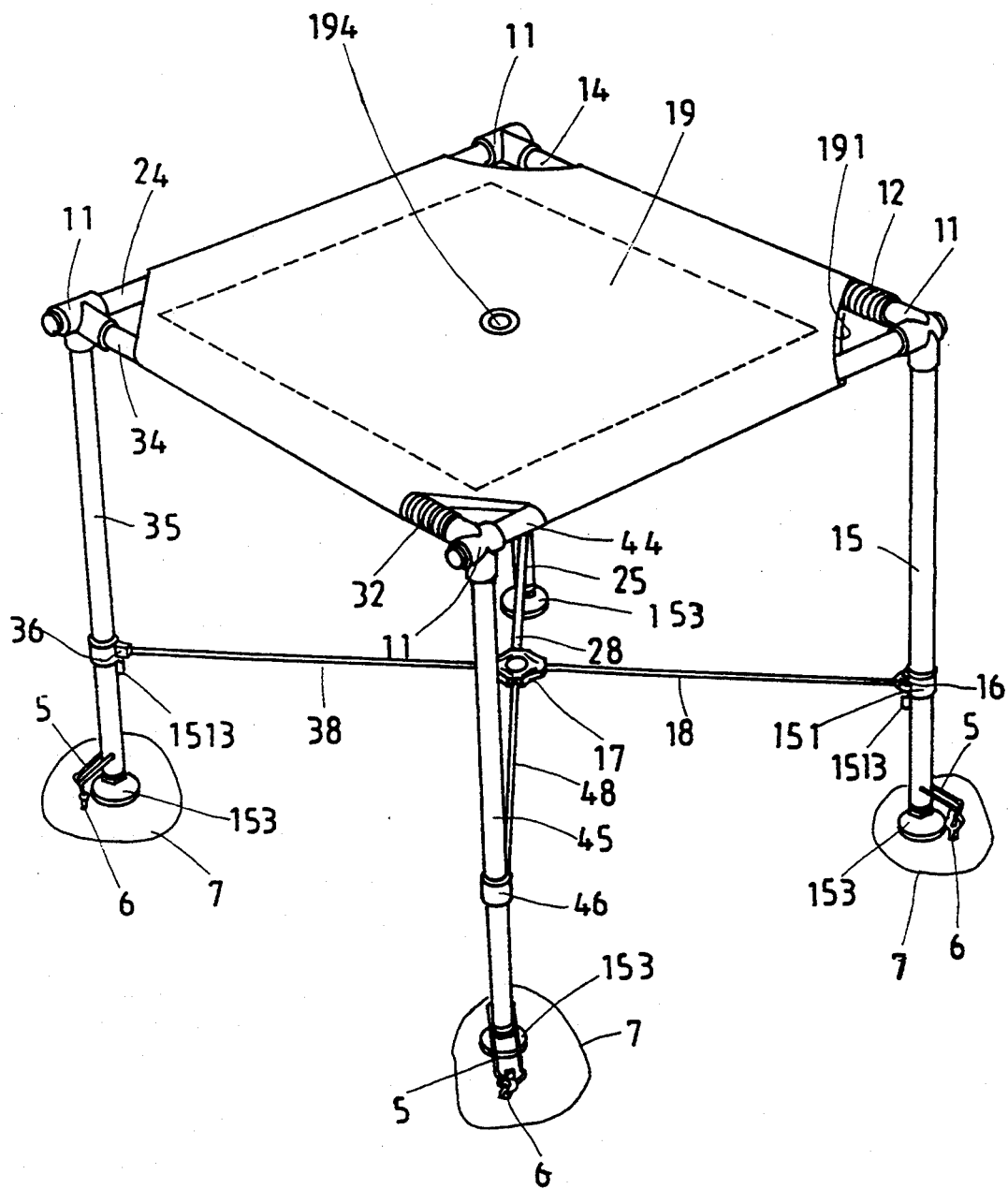
FIG. 3 is an elevational view of the collapsible table shown in FIG. 2.

Referring to FIGS. 2, 2A and 3, the coupling device 17 has four mounting holes 171;172;173;174 at four corners, which receive the four bracing bars 18;28;38;48 to support the four supporting frames 15;25;35;45. As an arrangement of the present invention, one bracing bar 18 may be affixed to one mounting hole 171 of the coupling device 17, and the other bracing bars 28;38;48 are detachably fastened to the mounting holes 172;173;174. When assembled, the bracing bars 18;28;38;48 are respectively connected between the coupling device 17 and the brace connectors 16;26;36;46 on the supporting frames 15;25;35;45.

Referring to FIG. 3 again, a canvas table cloth 19 is provided having four sleeves 191 at four sides respectively mounted around the four stretchers 14;24;34;44, and a center through hole 194 in the center for mounting a beach umbrella. As the supporting frames 15;25;35;45 are stretched by the bracing bars 18;28;38;48, the table is kept in shape when it is set up. Furthermore, because the stretchers 14;34 are respectively connected to the respective four-way pipe joints 11 by the connectors 12;32 through plug joints and the connectors 12;32 are connected to the stretchers 14;34 through screw joints, the pitch between two four-way pipe joints 11 at either side can be adjusted, permitting the table cloth 19 to be tightly stretched.

Figure 4A:
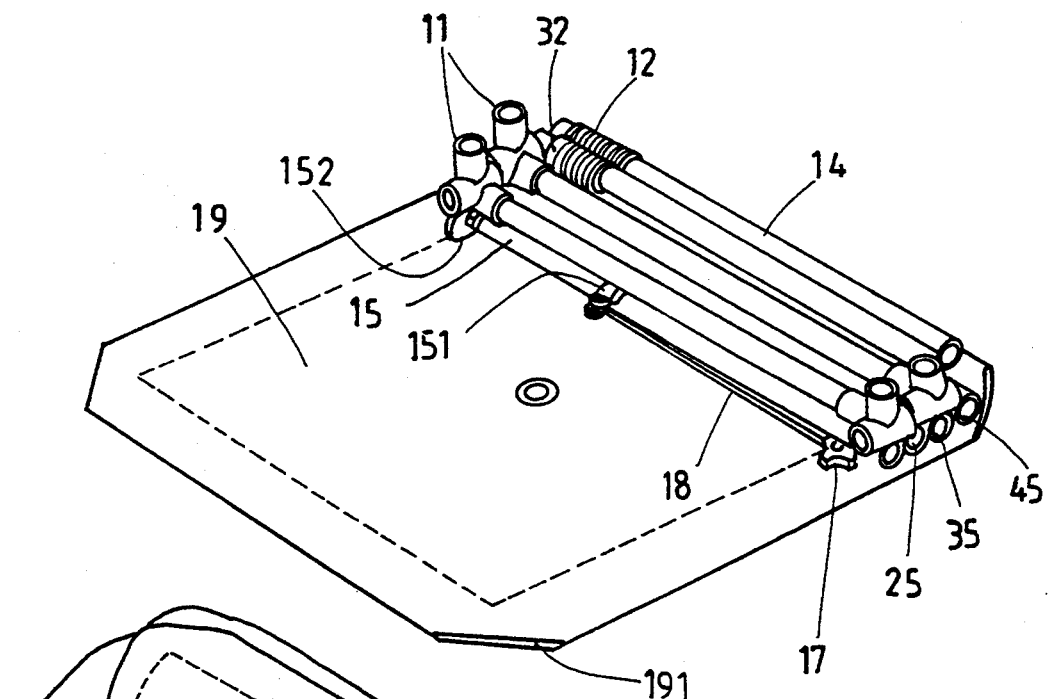
FIG. 4A shows the collapsible table collapsed.
Figure 4B:
FIG. 4B shows the collapsible table collapsed and wrapped by the table cloth thereof.
Figure 4C:
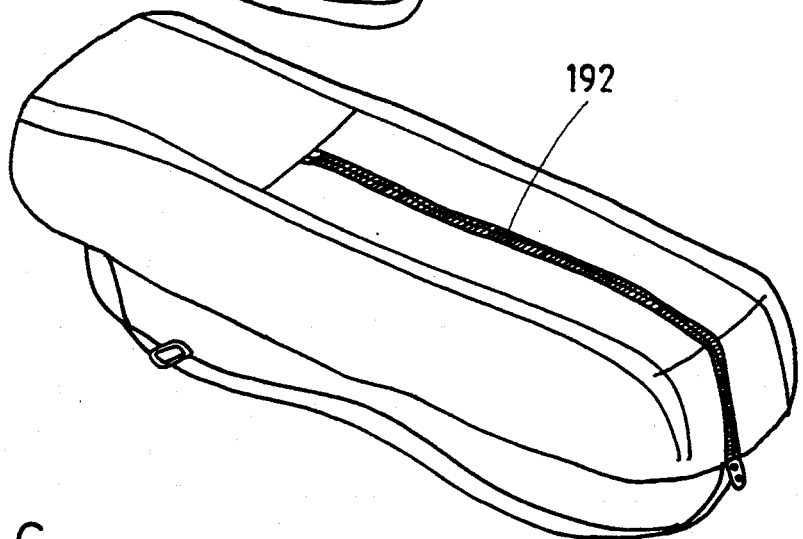
FIG. 4C shows the table cloth fastened up by the zip fastener thereof.

Referring to FIGS. 4A, 4B and 4C, a zip fastener 192 is fastened to back panels 193 on the back side of the table cloth 19. When the table frame is collapsed, it is wrapped by the table cloth 19, and the zip fastener 192 is fastened up permitting the collapsed table frame packed on the inside.

Figures 5, 5A:
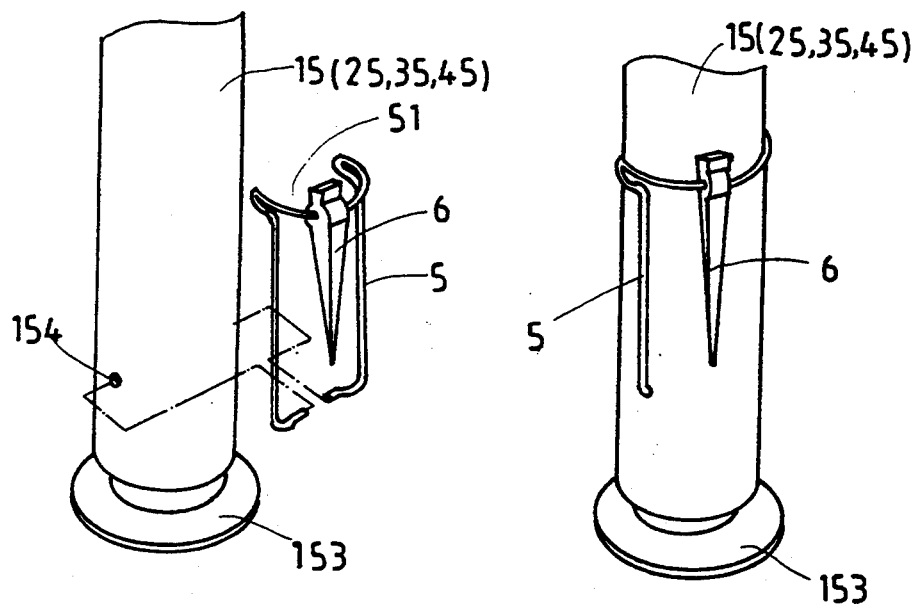
FIG. 5 is a dismantled view of an anchoring device according to the present invention.
FIG. 5A shows the anchoring device of FIG. 5 mounted on the upright supporting frame.
Figure 5B:
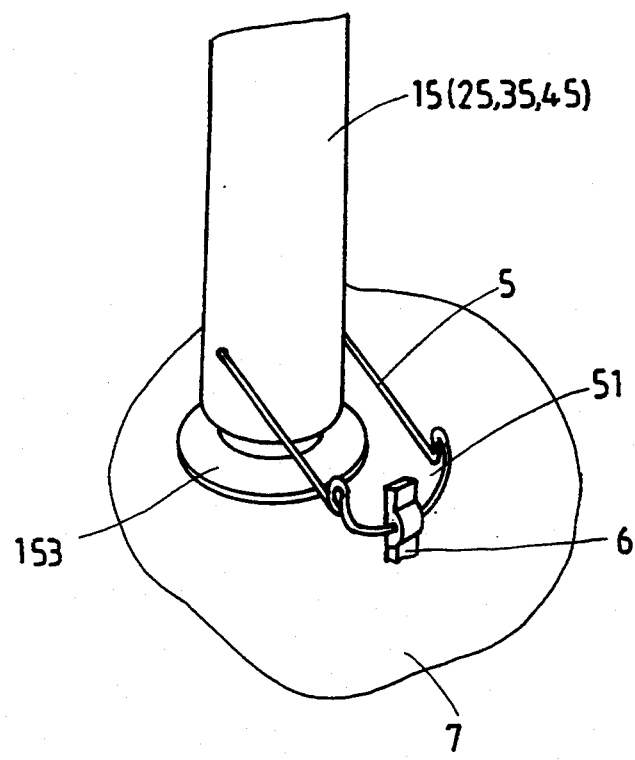
FIG. 5B shows the anchoring device of FIG. 5-1 fastened to the ground.

Referring to FIGS. 5, 5A and 5B, the upright supporting frame 15;25;35;45 has two opposite locating holes 154 spaced between the cushion 153 and the stop rod 1513 for mounting an anchoring device. The anchoring device comprises a spring wire 5 having two opposite ends pivotally fastened to the two opposite locating holes 154, a clamping portion 51 in the middle, and an anchoring nail 6 pivotally mounted on the clamping portion 51 for fastening to the ground 7. When not in use, the clamping portion 51 is clamped on the upright supporting frame 15;25;35;45.

What is claimed is:

1. A collapsible table comprising:
   four of four-way pipe joints at four corners;
   a pair of first stretchers and a pair of second stretchers respectively connected between said four-way pipe joints at four sides;
   two stretcher connectors respectively and horizontally connected between both first stretchers and a corresponding four-way pipe joint, each stretcher connector comprising a connector body having one end connected to the respective four-way pipe joint through a plug joint and an opposite end connected to the respective first stretcher through a screw rod threaded into a screw hole on one end of the respective first stretcher;

four upright supporting frames respectively and vertically connected to said four-way pipe joints at the bottom;

a table cloth having four sleeves at four sides respectively mounted around said first and second stretchers;

a bracing device supported between said upright supporting frames and spaced below said table cloth, said bracing device comprising a coupling device suspended between said upright supporting frames in the center, and four bracing bars each connected between said coupling device and either upright supporting frame, each bracing bar having one end coupled to said coupling device at a corner and an opposite end terminating in a brace connector fastened to the respective upright supporting frame by a respective clamping plate; and four anchoring devices respectively mounted on said upright supporting frames for fastening to the ground, each anchoring device comprising a spring wire having two opposite ends pivotally fastened to two opposite locating holes on the respective upright supporting frame, a clamping portion in the middle for clamping on the respective upright supporting frame when not in use, and an anchoring nail pivotally mounted on said clamping portion for fastening to the ground.

* * * * *